United States Patent [19]

Ochs

[11] Patent Number: 4,634,467
[45] Date of Patent: Jan. 6, 1987

[54] HYDROMETALLURGICAL PROCESS FOR COPPER RECOVERY

[75] Inventor: Leonard R. Ochs, Tucson, Ariz.

[73] Assignee: Duval Corporation, Tucson, Ariz.

[21] Appl. No.: 760,565

[22] Filed: Jul. 30, 1985

[51] Int. Cl.[4] ........................................... C22B 15/00
[52] U.S. Cl. ........................................ 75/117; 75/2;
75/97 A; 75/114; 75/118 R; 75/121; 423/38;
423/53; 423/567 A; 204/107
[58] Field of Search ............... 204/107; 75/117, 97 A,
75/2, 114, 121, 118 R; 423/38, 53, 567 A

[56] References Cited

U.S. PATENT DOCUMENTS

| | | | |
|---|---|---|---|
| 3,879,272 | 4/1975 | Atwood et al. | 204/107 |
| 3,901,776 | 8/1975 | Kruesi et al. | 204/107 |
| 4,138,248 | 2/1979 | Narain | 423/38 |
| 4,236,918 | 12/1980 | Narain | 423/38 |
| 4,337,128 | 5/1982 | Haakonsen et al. | 204/107 |
| 4,384,890 | 5/1983 | Clevenger et al. | 423/38 |
| 4,544,460 | 10/1985 | Ochs | 204/107 |

Primary Examiner—John Doll
Assistant Examiner—Robert L. Stoll
Attorney, Agent, or Firm—Lowe, Price, Leblanc, Becker & Shur

[57] ABSTRACT

An improved hydrometallurgical process for the recovery of metallic copper, elemental sulfur, compounds of molybdenum and other valuable materials from copper sulfide ore concentrates, such as chalcopyrite. The process, comprising a reduction stage, metallic copper recovery stage, and a combined regeneration-purge-oxidation stage, is improved by the addition of a second reduction stage following the first or primary reduction stage, and by the addition of a by-product recovery stage after the second or secondary reduction stage. The secondary reduction stage also enhances overall process performance by allowing more flexible operating practices.

15 Claims, 3 Drawing Figures

HYDROMETALLURGICAL PROCESS FOR COPPER RECOVERY

FIELD OF THE INVENTION

This invention relates generally to hydrometallurgial processes which recover metallic copper from copper sulfide ore concentrates by enabling those processes to recover valuable by-product minerals from the concentrates. In accordance with this invention, elemental sulfur, compounds of molybdenum, and other valuable minerals, including gold, can be recovered during the processing of copper sulfide ore concentrates with aqueous solutions containing metal chlorides.

BACKGROUND

The basic hydrometallurgical process for recovering metallic copper from copper sulfide ore concentrates, such as chalcopyrite is described in U.S. Pat. Nos. 3,785,944 and 3,879,272, both commonly assigned, and incorporated by reference herein in their entirety.

The process as disclosed in U.S. Pat. No. 3,785,944 has four distinct stages: (a) A reduction stage in which fresh copper sulfide ore concentrate, especially chalcopyrite, is reacted with an aqueous chloride solution containing cupric chloride, ferrous chloride, and a small amount of ferric chloride to form a solution that contains cuprous chloride and ferrous chloride; (b) A metal recovery stage where the reduced solution from the reduction stage is electrolyzed to produce metallic copper at a cathode and with cupric chloride regenerated at an anode; (c) A regeneration-purge stage where the ferrous chloride and remaining cuprous chloride in the spent electrolyte from the metal recovery stage are oxidized with air or oxygen to produce an aqueous chloride solution that contains cupric chloride and ferric chloride while concurrently precipitating excess iron as basic iron oxides and sulfate ions as jarosite; and, (d) An oxidation stage where the partially reacted copper sulfide ore concentrate from the reduction stage is further oxidized by the solution from the regeneration-purge stage to complete the solubilization of the copper therefrom while producing a solution that consists of cupric chloride, ferrous chloride, and a small amount of ferric chloride which is then recycled to the reduction stage after removal of the precipitated solids.

U.S. Pat. No. 3,879,272, a continuation-in-part of U.S. Pat. No. 3,785,944, enhanced the basic process by teaching: (a) The advantage of a three stage process obtained by combining into one stage the regeneration-purge stage and the oxidation stage; (b) The improved performance of the reduction stage by use of increased chloride ion concentrations obtained by using mixtures of sodium chloride, potassium chloride, and/or magnesium chloride; and, (c) The advantage of using potassium chloride to precipitate potassium jarosite, thereby effecting an essentially complete purge of sulfate ions from the solution during the operation of the combined regeneration-purge-oxidation stage.

The process, as outlined above, is effective in the commercial production of metallic copper from copper sulfide ore concentrates. However, the process does not allow for the economic recovery of other commercially valuable components of the concentrate or the residue waste, such as: elemental sulfur, compounds of molybdenum, or, if present, gold.

Inherent in the operation of the electrolytic step of the metal recovery stage is another disadvantage. U.S. Pat. No. 3,785,944 restricts the amount of " . . . metallic copper produced at the cathode to be not more than about one-half of the cuprous copper in the cuprous chloride solution feed to the electrolytic cells . . . ". During the continuous operation of the process, it frequently happens that much more than one-half of the copper in the electrolytic cell feed solution must be removed in order to assure an overall process metallurgical balance. When this occurs, there no longer exists a balance between the cuprous chloride that is reduced to metallic copper at the cathode and cuprous chloride that is oxidized to cupric chloride at the anode. This imbalanced condition will also arise if the electrolytic cell feed solution contains some unreduced cupric chloride. In this situation, the cathodic reduction of cupric chloride to cuprous chloride causes the equivalent anodic oxidation of cuprous chloride to cupric chloride thereby depleting The inventory of cuprous chloride in the anolyte that balances the cathodic reduction of cuprous chloride to metallic copper. These imbalances are a problem because cuprous chloride undergoes anodic oxidation more rapidly and more easily than do ferrous chloride or chloride ion. As a result, once the anodic reserves of cuprous chloride are depleted, some chlorine gas is liberated at the anode despite the presence of ferrous chloride in the solution surrounding the anode. This condition of chlorine gas evolution causes more rapid degradation of the anode and may create a health hazard for those involved with the operation of the electrolytic cells. These problems are aggravated when the tank house is operated at very high current densities (i.e., anodic current densities that are greater than about 500 amperes per square meter).

One other disadvantage of the described process is the susceptability of the final stage of leaching, the oxidation stage or the combined regeneration-purge-oxidation stage, to process upsets that results in either poor dissolution of the copper sulfide minerals, or excessive precipitation of iron with subsequent precipitation of copper oxychlorides that are lost with the residue waste.

At the present time, there are no known hydrometallurgical processes that have been designed to recover metallic copper from copper sulfide ore concentrates that also: (a) permits the potential economic recovery of elemental sulfur, compounds of molybdenum, and other valuable components of the concentrate or residue waste; (b) prevents anode damage and hazardous chlorine gas evolution caused by metallurgical upsets; and (c) ensures constant maximal solubilization of the copper sulfide minerals despite process upsets. The process of this invention is designed to meet these needs.

SUMMARY OF THE INVENTION

An object of the present invention is to provide a hydrometallurgical process for the treatment of copper sulfide ore concentrates for the purpose of producing metallic copper while providing for the economic recovery of elemental sulfur, compounds of molybdenum, and, if present, gold.

In a process aspect, this invention includes an improved hydrometallurgical process for the production of copper metal, wherein the present invention comprises the integration of a hydrometallurgical process described above.

Other advantages of the present invention will appear from the following description, examples and claims.

According to the present invention, it has been discovered that these objects can be accomplished and the difficulties of prior art processes can be obviated by the use of a process having five basic stages which can be briefly described as primary reduction, secondary reduction, metal recovery, by-product recovery, and combined regeneration-purge-oxidation.

In the Primary Reduction Stage, a solution that contains cuprous chloride and ferrous chloride is produced from a solution that contains cupric chloride and ferric chloride. To prevent cuprous chloride from precipitating, suitable metal chloride salts, such as sodium chloride, potassium chloride, and magnesium chloride, are included in the process solution. This primary reduction is accomplished in two steps: (a) an aqueous chloride solution that contains cupric chloride and ferric chloride is reacted with fresh copper sulfide ore concentrates at a controlled temperature of between about 100° C. and 110° C.; and, (b) after a suitable liquid-solids separation step, the partially reduced solution is further reduced with additional reducing agent such as metallic copper, metallic iron, and/or electricity.

In the Secondary Reduction Stage, a solution that contains cuprous chloride, ferrous chloride and some unreduced cupric chloride is produced from a solution that contains cupric chloride and ferric chloride. This secondary reduction is accomplished in one step by reacting an aqueous chloride solution that contains cupric chloride and ferric chloride with the partially reacted sulfide ore concentrates obtained from the liquid-solids separation step of the Primary Reduction Stage. The time required to essentially completely dissolve the remaining copper sulfide minerals is dependent on the particle size of the copper sulfide minerals, the temperature of the reaction mixture and the concentration of both cupric chloride and ferric chloride in the solution. After the desired amount of reaction has been achieved, the reaction mixture is subjected to a suitable liquid-solids separation step.

In the Metal Recovery Stage, the solution from the Primary Reduction Stage is subjected to electrolysis to deposit metallic copper at a cathode and to regenerate cupric chloride at an anode. The electrolysis step is so arranged as to deposit at the cathodes an amount of copper equal to the total amount of copper contained in the copper sulfide ore concentrate introduced to the process plus any metallic copper introduced into step (b) of the Primary Reduction Stage minus any copper lost from the process as undissolved copper sulfide minerals or lost as unrecovered process solution entrained in the final insoluble waste residue obtained from the Combined Regeneration-Purge-Oxidation stage described below. It is desirable to remove only one-half of the copper from the electrolysis feed solution. However, it has been discovered that if more than one-half of the copper must be removed to achieve an overall plant metallurgical balance then the partially reduced cuprous chloride containing solution obtained from the secondary reduction stage can be used to feed the anode or anodes that are paired with those cathodes where the excess electrolysis is taking place. This prevents the anodic oxidation of chloride ion thereby preventing the release of corrosive and hazardous chlorine gas.

In the Combined Regeneration-Purge-Oxidation Stage, secondary reduction stage discharge solution and spent electrolyte from the metal recovery stage, both solutions containing cuprous chloride, ferrous chloride and cupric chloride, are reacted with oxygen to produce a solution containing cupric chloride, ferric chloride, and some unoxidized ferrous chloride. The iron in solution that was dissolved from the copper sulfide ore concentrate and other excess iron, precipitates as iron oxide, the exact form and composition of which depends upon the chemical composition of the reaction mixture and the temperature at which the reaction occurs. If suitable monovalent cations, such as sodium or potassium ions, are present in the solution, then sulfate ions will coprecipitate with the iron as the appropriate jarosite. These reactions are performed in the presence of the by-product recovery stage discharge solids in order to discourage the formation of scale on equipment surfaces, and to finish reacting the small amounts of any undissolved copper sulfide minerals that may have been discharged from the secondary reduction stage reactor. When the reaction is finished, the slurry is cooled and transferred to a liquid-solids separation step. The solid residue is discarded after an appropriate washing step, and the regenerated solution is recycled to the primary and secondary reduction stages.

The secondary reduction discharges a solid residue that has the following characteristics: (a) it has less than about 50 percent of the original ore concentrate mass; (b) it contains no precipitated iron oxides; (c) any unreacted copper mineral is present as remnants of partially reacted large particles of chalcopyrite; (d) on a weight basis, it comprises at least 50 percent elemental sulfur. This solid particulate residue is the feed material to the By-Product Recovery Stage.

The By-Product Recovery Stage is comprised primarily of a secondary reduction stage residue washing section, and an elemental sulfur recovery section. It is possible to include a section for recovering molybdenum compounds, or a section for gold recovery; however, elemental sulfur must be removed before any other by-product minerals can be recovered.

In the residue washing section of the By-Product Recovery Stage, the Secondary Reduction Stage residue is washed counterconcurrently to free it of all entrained process solution. The high concentration filtrate is passed on to the Combined Regeneration-Purge Stage and the low concentration wash solutions are passed on to the final iron oxide waste residue washing section. In order to prevent iron and copper hydroxides from precipitating, it is necessary to wash the By-Products Recovery Stage feed solids with a dilute hydrochloric acid solution which has a pH of less than about 2.7.

In the elemental sulfur recovery section of the By-Product Recovery Stage, elemental sulfur may be separated from the nonsulfur gangue material of the washed Secondary Reduction Stage residue by several techniques, for example: (a) controlled formation of sulfur spheres by cooling an agitated suspension of molten sulfur with gangue in water to a temperature below the freezing temperature of sulfur followed by a screen separation of the sulfur enriched coarse material; (b) solvent extraction using any of the common organic elemental sulfur solvents; (c) solvent extraction using aqueous solutions of inorganic reagents that dissolve elemental sulfur; (d) distillation or sublimation of the elemental sulfur.

In the molybdenum recovery section of the By-Product Recovery Stage, the residue from the sulfur recovery section may be treated to recover molybdenum compounds. This can be done, for example, by; hypochlorite leaching of the molybdenum disulfide, or low pressure sublimation of the molybdenum disulfide in and inert gas at elevated temperatures. The hypochlorite solution may be continuously generated in a closed circuit by the electrolysis of a sodium chloride solution. The dissolved molybdate anion may be recovered from solution by adsorption on anionic ion exchange resins.

In the gold recovery section of the By-Product Recovery Stage, the residue from either the sulfur recovery section or the molybdenum recovery section may be treated by conventional cyanidation technology or by thiourea leaching technology. The residue from the gold recovery section is passed on to the Combined Regeneration-Purge-Oxidation Stage to dissolve copper from any remaining unreacted copper sulfide minerals and to discourage stale formation on equipment surfaces.

BRIEF DESCRIPTION OF THE DRAWINGS

Reference is now made to the drawings accompanying the application wherein.

DESCRIPTION OF PREFERRED EMBODIMENTS

Figure 1:
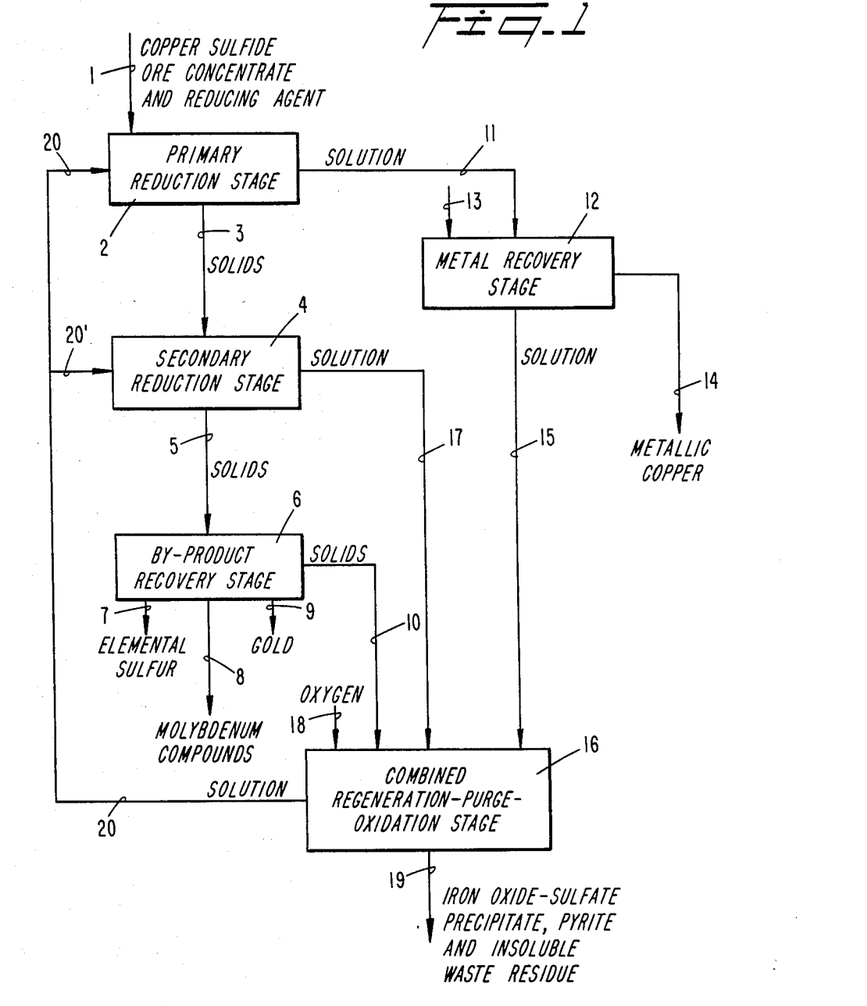
FIG. 1 presents a simplified flow diagram showing the major processing stages of the improved process of this invention for the production of metallic copper from copper sulfide ore concentrates.
Figure 2:
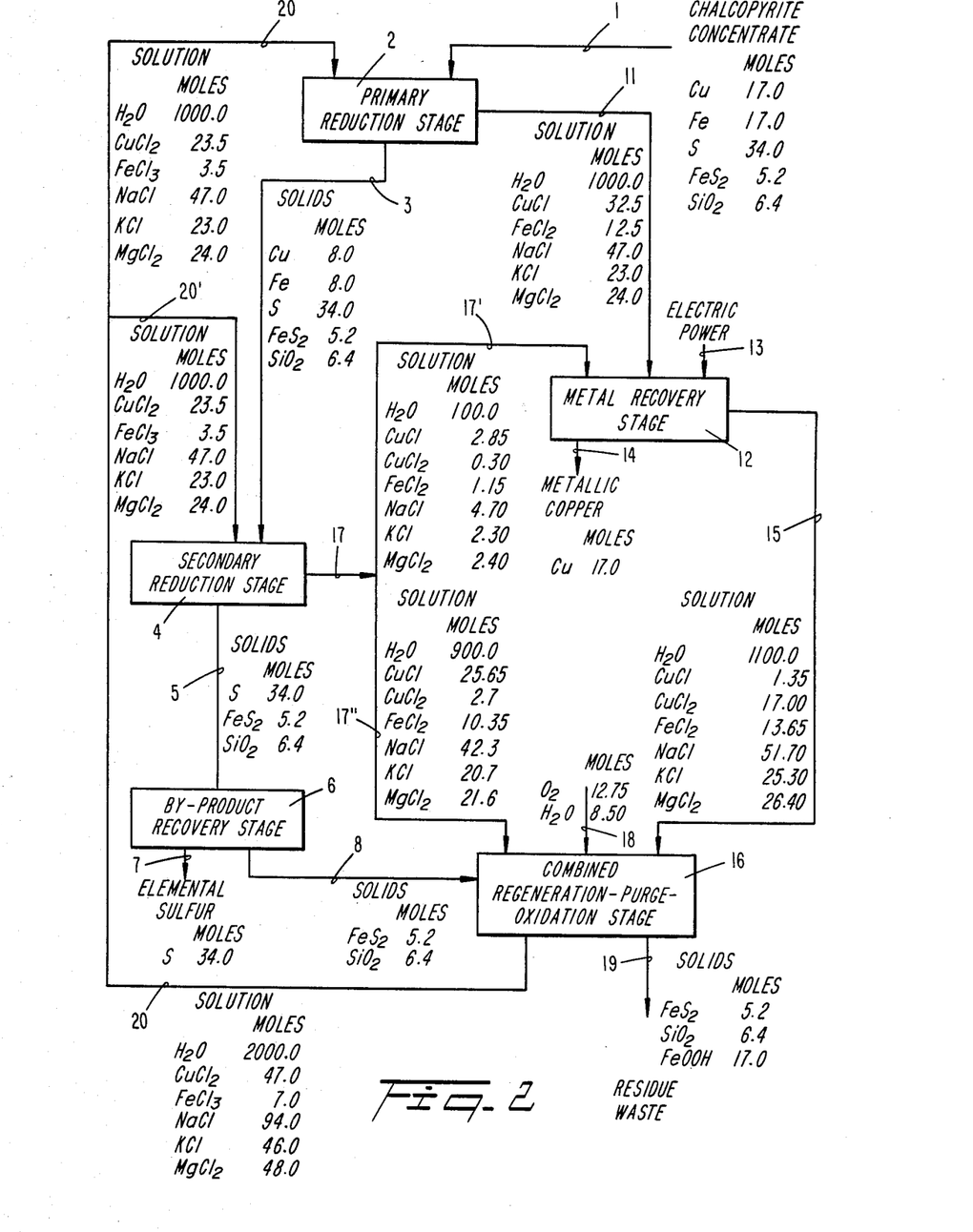
FIG. 2 presents a stoichiometric mole balance to illustrate the basic chemistry of the improved process of this invention when the copper sulfide ore concentrate is chalcopyrite.

The improved basic process for the extraction of copper from copper sulfide ore concentrates wherein a secondary reduction stage is placed between the primary reduction stage and the Combined regeneration-purge-oxidation stage will readily be understood from the diagram of FIG. 1, and the basic chemistry is illustrated by the stoichiometric mole balance of FIG. 2. For a more complete description of a preferred embodiment, however, reference should be made to FIG. 3 and the following description.

In the description below, certain words and phrases will be used in a manner such that they require rather exact definitions. These follow immediately. As used herein, the phrase "supporting electrolyte" shall refer to an aqueous solution of suitably inert metal salts, such as, sodium chloride, potassium chloride, magnesium chloride, and mixtures of these metal salts. The word "inert" is used to describe metal ions that do not readily enter into oxidation-reduction reactions in aqueous solutions. Examples of inert metal ions are those metal ions that are derived from metals belonging to groups IA, IIA, and IIIA in the Periodic Table, exclusive of hydrogen ion. Reactive metal salts are dissolved in the supporting electrolyte. The word "reactive" is used to describe metal ions which readily enter into oxidation-reduction reactions in aqueous solution. Examples of reactive metal ions are those metal ions that are derived from metals belonging to groups IVA, VA, VIA, VIIA, IB, IIB, IIIB, IVB, VB and hydrogen ion, exclusive of the ions of boron, aluminum and silicon. The group designations used above are those recommended by the IUPAC for the subgroups of the Periodic Table of the elements.

Reference is now made to FIG. 1 which broadly describes the process of the invention. Thus, a copper sulfide ore concentrate from line 1, which includes reducing agents, is introduced into Primary Reduction Stage 2. Recycle solution containing $CuCl_2$, $FeCl_3$, $MgCl_2$, and alkali metal chlorides is also fed into the Primary Reduction Stage via line 20.

The solids from the Primary Reduction Stage 2, which comprise copper, iron, sulfur, iron sulfide, and sand, and including unreacted components, are passed by line 3 to Secondary Reduction Stage 4. Recycle solution is also introduced into the Secondary Reduction Stage via line 20'.

The solids remaining from the Secondary Reduction Stage, which now generally comprises sulfur, iron sulfide and sand, is passed by line 5 to By-Product Recovery Stage 6. From this stage elemental sulfur is recovered at 7, molybdenum compounds at 8, and gold or other precious metals at 9, all as described above. The solids residue is then passed by line 10 to the Combined Regeneration-Purge-Oxidation Stage 16.

In the meantime, the solution recovered from the Primary Reduction Stage, which contains $CuCl$, $FeCl_2$, $MgCl_2$, and alkali metal chlorides, is passed by line 11 into Metal Recovery Stage 12. In Metal Recovery Stage 12, electricity is introduced by line 13 to carry out electrolysis to produce metallic copper at a cathode and cupric chloride at an anode. The metallic copper is shown as being recovered at 14.

The spent catholyte from the Metal Recovery Stage is then passed by line 15 to the Combined Regeneration-Purge-Oxidation Stage 16, together with the solution in lie 17 from the Secondary Reduction Stage. In the Combined Regeneration-Purge-Oxidation Stage, the compounds are reacted with oxygen from line 18 to produce a solution comprising cupric chloride, ferric chloride, and some unoxidized ferrous chloride. The iron in solution which was dissolved from the copper sulfide ore concentrate, and other excess iron, precipitates as iron oxide. These components are removed at 19 together with pyrite and insoluble waste residue.

The solution from the Combined Regeneration-Purge-Oxidation Stage, is recycled by line 20 and 20' to the Primary Reduction Stage 2 and Secondary Reduction Stage 4.

Thus it will be seen that the process provides for recovery of the metallic copper as well as the sulfur in elemental form, molybdenum compounds, and precious metals such as gold and silver.

FIG. 2 is similar to FIG. 1 and like reference numerals represent like components. However, FIG. 2 sets forth a stoichiometric mole balance for the basic chemistry of the system when the copper sulfide ore concentrate is chalcopyrite. It will be noted that FIG. 2 follows FIG. 1 in all respects except that the solution in line 17 from the Secondary Reduction Stage is divided into two portions; one portion in line 17' being passed to the Metal Recovery Stage 12 to recover metallic copper, and the second portion in line 17" being passed to Combined Regeneration-Purge-Oxidation Stage 16. Also, FIG. 2 does not show molybdenum and gold recovery, but rather passes these products to Combined Regeneration-Purge-Oxidation Stage 16.

From FIG. 2, it will be noted that the original concentrate contained 17.0 moles of copper and 34.0 moles of sulfur. All of the copper is ideally recovered at 14 and all of the sulfur is ideally recovered at 7.

Figure 3:
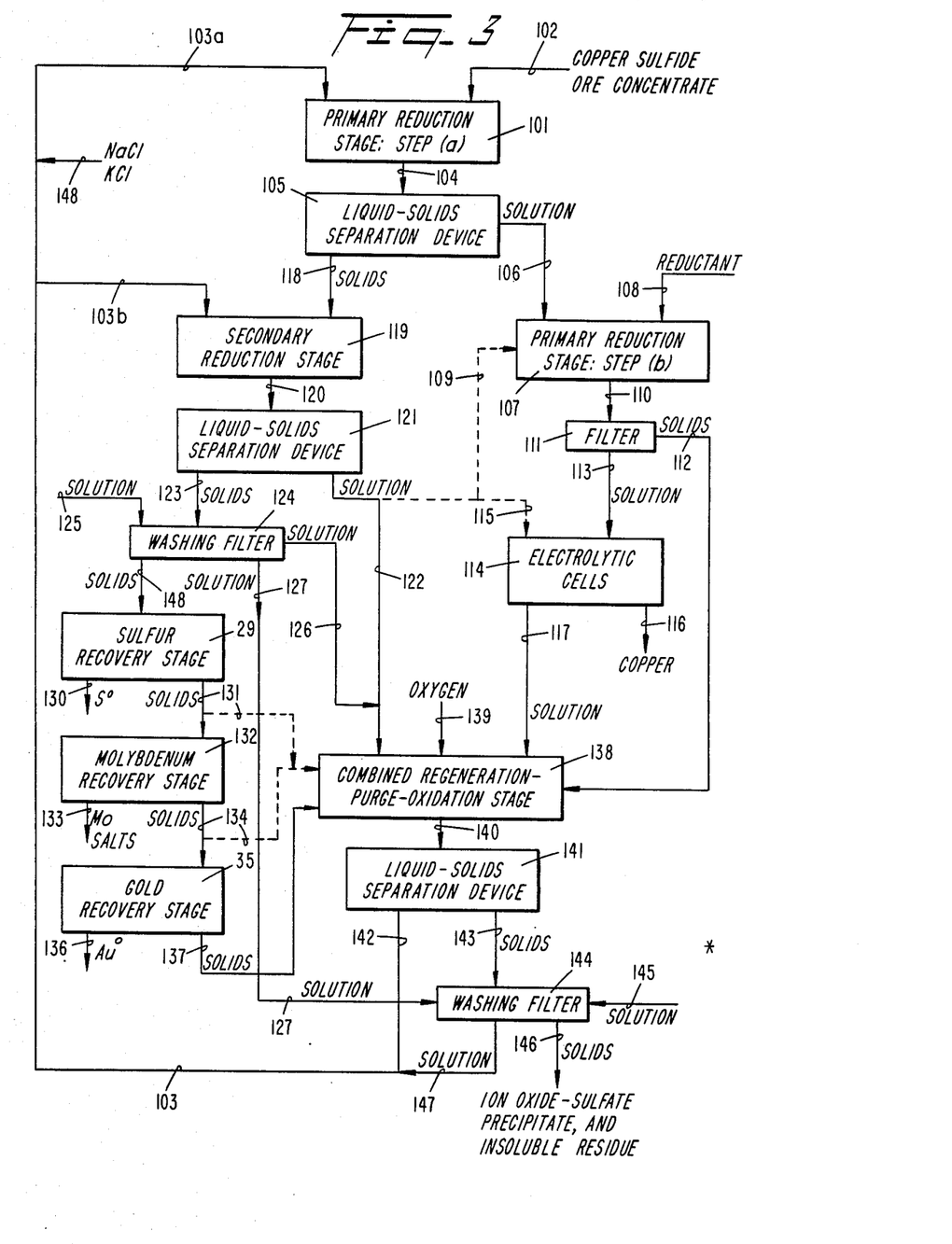
FIG. 3 presents a flow diagram of a preferred embodiment of the improved process according to this invention, the dashed lines being used to indicate alternate flow paths.

Referring now to FIG. 3, copper sulfide ore concentrates comprised mainly of chalcopyrite from line 102 are added to step (a) of Primary Reduction Stage 101. Recycle cupric chloride, ferric chloride and supporting electrolyte are introduced into step (a) of the Primary Reduction Stage 101, through line 103a. In this stage, the cupric chloride and ferric chloride are substantially reduced to cuprous chloride and ferrous chloride by reaction with the sulfide ore concentrate step (a) of the Primary Reduction Stage 101. This stage is essentially closed to the atmosphere and operated near the atmospheric boiling temperature of the solution, about 107° C. The partially reacted concentrate and the solution, which now contains cuprous chloride, ferrous chloride, some unreduced cupric chloride and the supporting electrolyte, are passed by line 104 to a liquid-solids separation device 105, where the solids are separated from the bulk of the solution by gravity sedimentation.

The solution is then passed from separator 105 by line 106 to step (b) of the Primary Reduction Stage 107. Additional reductant, such as, granular or cement copper and/or powdered or granulated iron metal, is brought into step (b) 107 through line 108. This reductant is used to substantially reduce all of the remaining unreacted cupric chloride to cuprous chloride. If copper is used, it is solubilized as cuprous chloride. If metallic iron is used, it is solubilized as ferrous chloride. Step (b) of the Primary Reduction Stage can be operated at any temperature between 25° C. and 107° C. However, it is most efficient if it is operated at a temperature between 65° C. and 80° C.

The mixture from step (b) 107 of the Primary Reduction Stage is passed by line 110 to a polishing filter 117 capable of removing fine suspended solids. Any solids which are collected on filter 111 are passed on to the Combined Regeneration-Purge-Oxidation Stage, 138, through line 112.

The filtered solution then passes through line 113 into the electrolytic cells 114. In these cells, where the anodes and cathodes are separated by permeable diaphragms, cuprous chloride is electrolytically reduced and oxidized, depositing metallic copper at the cathodes and producing, in solution, cupric chloride at the anodes. This balance is achieved by requiring that no more than exactly one-half of the cuprous chloride from the solution in line 13 be reduced to metallic copper at the cathodes. The remaining cuprous chloride is directed into the anodic compartment and is oxidized to cupric chloride. A balance of this type assumes: (a) that one-half of the copper in the solution is exactly equal to the total amount of copper fed to the plant by lines 102 and 108 minus the amount of copper lost from the plant by line 146, (i.e., the amount of copper to be produced); and (b) that all of the copper in the solution is present as cuprous chloride. If this balance does not exist and more than one-half of the cuprous chloride contained in the solution must be reduced to metallic copper, or if other inefficiencies upset the balance, then additional cuprous chloride can be introduced to the anode compartments from the secondary reduction stage liquid-solids separation device 121 through alternate (i.e., the dashed) line 115, thereby avoiding the oxidation of ferrous chloride to ferric chloride and the oxidation of chloride ion to chlorine gas at the anode. The metallic copper and any codeposited metallic silver is removed from the electrolytic cells 114 through line 116. The spent cathode from the electrolytic cells is passed by line 117 into Combined Regeneration-Purge-Oxidation Stage 138 for further processing as described hereinafter.

The partially reacted sulfide concentrate from the liquid-solid separation device 105 is passed by line 118 into the Secondary Reduction Stage 119, cupric chloride, ferric chloride, and supporting electrolyte are introduced into the secondary reduction stage 119, by line 103b. The cupric chloride and ferric chloride components of the solution are reduced to cuprous chloride and ferrous chloride by reaction with the partially reacted sulfide concentrate in the Secondary Reduction Stage reactor 119, which is essentially closed to the atmosphere and operated at a temperature that is between the normal boiling temperature of the solution, that is between about 107° C. and 140° C. If the operating temperature is above the normal boiling temperature of the solution, then the reactor must be operated with a pressure equivalent to or greater than the vapor pressure of water in equilibrium with the solution, approximately 10 to 25 psig at a temperature of 130° C. The reaction is allowed to proceed until the concentrates have had substantially all of their copper solubilized.

On completion of the reaction, the reactive metal ions are predominantly in their lower valence states. However, the solution produced in the Secondary Reduction Reactor 119, is not as reduced as the solution that exits step (a) of the Primary Reduction Reactor 101. The slurry is then passed from the reduction stage 119 by line 20 to a liquid-solids separation device 121, where the solids are separated from the bulk of the solution by gravity sedimentation. The reduced solution from separator 121 is passed through line 122 to the Combined Regeneration-Purge-Oxidation stage 138. However, if additional reduced solution is required in the anode compartments of the electrolytic cells 114, then the required amount of reduced solution can be passed by alternate line 115 to the appropriate anode compartments. Any remaining solution is passed by line 122 to reactor 138.

The solids from separator 121 are passed by line 12 to a suitable filter 124, such as a horizontal belt vacuum filter, where substantially all of the remaining process solution is removed from the solids. The strong or highly concentrated filtrate is then passed by line 126 to the Combined Regeneration-Purge-Oxidation Stage 138. An appropriate wash solution, such as acidified water at a pH that is less than 2.7, is introduced by line 125 to the filter 124. The weak filtrate or wash solution from filter 124 is passed by line 127 to the final residue washing filter 144.

The washed and solution-free solids from filter 124 are then passed by line 128 to the sulfur recovery section 129 of the By-Product Recovery Stage. In the sulfur recovery section 129, elemental sulfur is separated from the pyrite, chalcopyrite, and siliceous insoluble residue by screening a plus 60 mesh screen fraction followed by solvent extraction of any sulfur that remains in the minus 60 mesh screen fraction. The plus 60 mesh screen fraction can be further purified by melting and filtering the hot liquid sulfur to remove any nonsulfur residue. That nonsulfur residue would carry some surface coating of once-melted sulfur and could be cleaned by a solvent extraction step. The product sulfur is recovered from the sulfur recovery section 129, by line 130.

The sulfur free solids are passed by line 131 to the molybdenum recovery stage 132 or they can be passed by alternate line 131 to the Combined Regeneration-Purge-Oxidation Stage 138. In the molybdenum recovery stage 132, the sulfur free solids are treated by either chemical leaching techniques or physical methods to recover molybdenum compounds. In the absence of air or oxygen, molybdenum disulfide begins to sublime at a temperature of about 450° C. It is thus possible to separate molybdenum disulfide from the pyrite, chalcopyrite, and silicious insoluble compounds of this residue solid by low pressure, high temperature sublimation using an inert gas as a carrier. Molybdenum disulfide also reacts with hypochlorite anion to produce sulfate anions and hydroxide soluble molydate anions and complexes. Hypochlorite can be generated by the electrolysis of concentrated sodium chloride solutions. The molybdate ions can be recovered from solution by adsorption on anionic ion exchange resins. The resulting molybdenum compounds are removed from section 132 by line 133.

The sulfur and molybdenite free residue solids are passed by line 134 to the gold recovery section 135, or they can be passed by alternate line 134 to the Combined Regeneration-Purge-Oxidation Stage 138, if there is no gold present. Gold can be recovered from this residue by conventional alkaline cyanide leaching technology. The gold product is removed from section 135 by line 136.

The by-product-free residue is recovered and passed through line 137 to the Combined Regeneration-Purge-Oxidation Stage 138. The spent electrolyte from the electrolyte cells, which now contains cupric chloride, ferrous chloride, and some unoxidized cuprous chloride, and the supporting electrolyte, is also passed by line 117 to stage 138. Also added to stage 138 are the solids from polishing filter 111 through line 112; the excess solution from the secondary reduction stage separation device 121 through line 122; and the strong filtrate from washing filter 124 through line 126. In stage 138, the input streams are heated to a temperature of between 110° and 150° C. with a pressure held constant between 55 and 60 psig using oxygen that is passed into reactor 138 by line 139. In reactor 138, the oxygen reacts with both ferrous chloride and cuprous chloride to form ferric chloride and cupric chloride while simultaneously precipitating excess iron from the solution in the form of iron oxides and potassium or sodium jarosites if sulfate ion is also present in the solution. The regenerated ferric chloride and cupric chloride react with any undissolved copper sulfide minerals from stage 119 as received by stage 138 from the by-product recovery stage (sections 129, 132, and/or 135).

At the end of the reaction period the slurry is passed by line 140 to liquid-solids separation device 141 where the solid residue is separated from the bulk of the solution by gravity sedimentation. The solids are removed from device 141 through line 143 to a washing filter 144 where substantially all of the remaining process solution is removed by displacement with an appropriate washing solution, such as water, which is brought to filter 144 by line 145. The weak wash solution from filter 124 can be passed by line 127 to filter 144 to act as an initial displacement solution. The concentrated filtrate is removed from the filter 144 by line 147 and combined with the solution that discharges from the liquid-solids separation device overflow through line 142 to form by this combination the recycle feed solution that is passed by line 103 to the reduction stages. The substantially process solution-free solids consisting of iron oxides, potassium or sodium jarosites, pyrite, and siliceous insolubles, are removed from filter 144 by line 146.

The regenerated leaching solution is divided into two approximately equal flows identified by line 103a and 103b. The chloride ion concentration of the solution represented by line 103a is kept at a predetermined or setpoint concentration by adding sodium chloride and/or potassium chloride salts through line 148. The need, or lack thereof, for adding makeup salts or other reagents depends on the efficacy of the final residue washing filter 144.

As described above, electricity was indicated as a potential reductant for step (b) of the Primary Reduction Stage. For example, if cement copper is in short supply, and/or if powdered or granular metallic iron is economically undesirable, then electrolytic reduction of the remaining cupric chloride in stream 106 is carried out. This can be accomplished by directing an appropriate amount of the solution from the Secondary Reduction Stage 119, via separator 121, through alternate line 109, to the anode chamber of this reduction electrolysis cell. In this electrolysis cell, cupric chloride dissolved in stream 106 would be reduced to cuprous chloride at the cathode, while cuprous chloride that is dissolved in the anolyte, as obtained from the Secondary Reduction Stage, would be oxidized to cupric chloride at the anode. The now completely reduced solution that exits the cathode chamber of the reduction electrolysis cell is passed on to the metal recovery stage electrolysis cells 114, while the partially oxidized solution from the anode chamber of the reduction electrolysis cell is passed to the Combined Regeneration-Purge-Oxidation Stage 138.

The reduction electrolysis cells can also be incorporated into the metal recovery stage electrolysis cells, as the following discussion illustrates. The available cement copper is used as a reductant in step (b) of the Primary Reduction Stage as previously described. The solution is clarified by filter 111 and is then passed by line 113 to the electrolysis cell 114, where any remaining cupric chloride is reduced on the cathodes of the first few cells while simultaneously precipitating metallic copper by the cathodic reduction of cuprous chloride. The anolyte for these cells is supplied wholly or in part by the mostly reduced solution obtained from the Secondary Reduction Stage 119, by passing the solution through alternate line 115. This anolyte is used only for those cells that contain catholyte with a significant cupric chloride concentration. When the catholyte is reduced, the anolyte is passed to the Combined Regeneration-Purge-Oxidation Stage 138. The reduced, and now partially copper-depleted catholyte is passed on to the remaining electrolysis cells for continued metal recovery. The source of anolyte for these remaining cells is the spent catholyte that is removed from the last cathode compartment of the last electrolysis cell. Any remaining secondary reduction stage discharge solution can still be used as makeup anolyte in the metal recovery stage if it is required. This mode of operation integrates step (b) of the primary reduction stage with the metal recovery stage.

If large amounts of cement copper reductant are available, then a different type of operating situation may exist. For example, if the amount of available cement copper reductant is stoichiometrically greater than the unreduced cupric chloride that is dissolved in the solution of stream 106, then the excess cement copper can be processed in step (b) 107 of the Primary Reduction Stage, by passing to 107 through alternate line 109, sufficient secondary reduction stage discharge solution to react with the excess cement copper reductant. The reduced solution that results is passed by line 110 to clarifying filter 111 and is then passed by line 113 to the metal recovery stage electrolysis cells 114. As in previously described modes of operation, if the anolyte becomes oxidized to the point where little or no cuprous chloride remains, then any remaining secondary reduction stage discharge solution can be used as replacement anolyte.

The following examples are presented to illustrate the invention but the invention is not to be considered as limited thereto. In these examples and throughout the specification, parts by weight unless otherwise indicated.

The results of laboratory experiments demonstrating the efficacy of the secondary reduction stage are summarized in Tables I through VI. In these tables, the ORP is the oxidation-reduction potential of the solution as measured at 25.0C using a platinum or high density graphite counter electrode and a silver-silver chloride reference electrode filled with silver chloride saturated 4.5 molal potassium chloride solution. The pHE is the potential of a glass electrode as measured at 25.0C using the same reference electrode described above. The glass electrode was standardized at 25.0C using appropriate buffer solutions.

EXAMPLE 1

Table I shows the ionic composition of the synthetic Combined Regeneration-Purge-Oxidation Stage discharge solution which was used as feed solution to the primary and secondary reduction stage reactors. Table I also shows the ionic constituents for a synthetic Combined Regeneration-Purge-Oxidation Stage reactor feed solution which is a mixture of the electrolytic cells discharge solution and the Secondary Reduction Stage discharge solution. All of the values in Table I are in weight percent.

TABLE I

| Ionic Component | Primary and Secondary Reduction Stage Feed Solution (% w/w) | Combined Regeneration-Purge-Oxidation Stage Feed Solution (% w/w) | Chemical Reagent used as the Source of the Ionic Component |
|---|---|---|---|
| $Cu^{+2}$ | 5.50 | 3.03 | $CuCl_2.2H_2O$ |
| $Cu^{+1}$ | — | 2.37 | $CuCl_2.2H_2O$ and $Cu°$ |
| $Fe^{+3}$ | 1.00 | — | $FeCl_3.6H_2O$ |
| $Fe^{+2}$ | — | 2.23 | $FeCl_2.4H_2O$ |
| $Na^{+1}$ | 3.70 | 3.63 | NaCl |
| $K^{+1}$ | 2.60 | 2.53 | KCl |
| $Mg^{+2}$ | 1.80 | 1.80 | $MgCl_2.6H_2O$ |
| $Zn^{+2}$ | 1.10 | 1.10 | $ZnCl_2$ |
| $Ca^{+2}$ | 0.15 | 0.15 | $CaCl_2$ |
| $H_2SO_4$ | — | 0.21 | $H_2SO_4$ (concentrated) |
| $H^{+1}$ | — | 0.02 | HCl (concentrated) |
| $Cl^-$ (total) | 22.81 | 22.84 | Total of above salts |
| $H_2O$ (total) | 61.34 | 60.09 | Deionized water and waters of hydration |

EXAMPLE 2

Table II shows the results from a series of Secondary Reduction Stage tests using a relatively fine chalcopyrite concentrate. These tests were done at atmospheric boiling and demonstrate the effect of retention time on the performance of the Secondary Reduction Stage. The copper content of the chalcopyrite concentrate was about 26.7 percent by weight. The first two tests, numbered 1 and 2 in the Table, represent typical primary reduction stage results. The primary reduction tests had a feed solution to feed concentrate solid weight ratio of 9.1:1, and were run at atmospheric boiling temperature for the reaction time indicated in the Table. The discharge solids obtained from identically run Primary Reduction Stage tests were used as feed solids for the Secondary Reduction Stage tests, numbered 3 through 12 in the Table. The data in the sixth, seventh and twelfth columns are calculated by using the original concentrate rather than the partially digested solids obtained from the Primary Reduction Stage.

TABLE II

| | | | FILTRATE | | | RESIDUE SOLIDS | | | | |
|---|---|---|---|---|---|---|---|---|---|---|
| Test No. | Time (Hours) | Temp. (°C.) | ORP (mV) | pHE (mV) | % S Total Oxidized | % Cu Dissolved | Cu Assay (%) | Fe Assay (%) | S° Assay (%) | Mo Assay (%) | Mass: % of Initial |
| 1 | 1.25 | 106 | 379 | 446 | 2.6 | 58.0 | 16.44 | 20.0 | 21.22 | 0.45 | 68.2 |
| 2 | 1.25 | 106 | 378 | 446 | 2.9 | 57.2 | 16.74 | 20.3 | 20.16 | 0.43 | 68.3 |
| 3 | 2 | 106 | 428 | 443 | 1.9 | 94.0 | 3.26 | 10.53 | 47.72 | 0.67 | 48.9 |
| 4 | 2 | 106 | 427 | 444 | 1.7 | 94.4 | 3.08 | 10.15 | 48.15 | 0.59 | 48.6 |
| 5 | 4 | 106 | 410 | 450 | 2.5 | 98.2 | 1.02 | 8.87 | 52.0 | 0.70 | 46.1 |
| 6 | 4 | 106 | 411 | 450 | 2.2 | 98.4 | 0.93 | 8.93 | 53.1 | 0.65 | 46.2 |
| 7 | 6 | 106 | 401 | 455 | 3.0 | 99.3 | 0.39 | 8.37 | 53.24 | 0.60 | 45.4 |
| 8 | 6 | 106 | 406 | 457 | 2.8 | 99.3 | 0.41 | 8.53 | 53.22 | 0.65 | 45.5 |
| 9 | 8 | 106 | 400 | 457 | 3.2 | 99.5 | 0.32 | 8.61 | 53.02 | 0.78 | 44.9 |
| 10B | 8 | 106 | 402 | 459 | 3.2 | 99.5 | 0.32 | 8.31 | 54.10 | 0.42 | 44.9 |
| 11 | 10 | 106 | 392 | 461 | 3.9 | 99.6 | 0.27 | 8.53 | 53.05 | 0.67 | 44.7 |
| 12 | 10 | 106 | 392 | 459 | 3.9 | 99.4 | 0.39 | 8.29 | 53.02 | 0.70 | 44.5 |

EXAMPLE 3

Table III shows the results from a similar series of tests using a relatively coarse chalcopyrite concentrate. This concentrate had a copper concentration of about 26.2 percent by weight. The first two tests, numbered 13 and 14, represent typical Primary Reduction Stage results for this concentrate. All other parameters are the same for these tests as for the tests summarized in Table II.

TABLE III

| Test No. | Time (Hours) | Temp. (°C.) | FILTRATE ORP (mV) | FILTRATE pHE (mV) | % S Total Oxidized | % Cu Dissolved | RESIDUE SOLIDS Cu Assay (%) | Fe Assay (%) | S° Assay (%) | Mo Assay (%) | Mass: % of Initial |
|---|---|---|---|---|---|---|---|---|---|---|---|
| 13 | 1.25 | 106 | 379 | 445 | 2.6 | 58.2 | 15.96 | 19.65 | 19.31 | 0.37 | 6.87 |
| 14 | 1.25 | 106 | 381 | 444 | 2.7 | 57.7 | 16.15 | 19.49 | 19.77 | 0.36 | 68.7 |
| 15 | 2 | 106 | 431 | 443 | 1.4 | 93.4 | 3.45 | 10.90 | 45.17 | 0.51 | 50.1 |
| 16 | 2 | 106 | 429 | 440 | 1.3 | 93.4 | 3.47 | 10.72 | 45.57 | 0.35 | 49.9 |
| 17 | 4 | 106 | 417 | 452 | 2.2 | 97.9 | 1.16 | 9.24 | 49.78 | 0.55 | 47.4 |
| 18 | 4 | 106 | 415 | 450 | 2.1 | 97.9 | 1.19 | 9.13 | 49.65 | 0.47 | 47.2 |
| 18.5 | 5 | 106 | 412 | 452 | 2.4 | 98.7 | 0.71 | 8.80 | 50.75 | 0.51 | 46.6 |
| 19 | 6 | 106 | 409 | 453 | 2.7 | 99.0 | 0.55 | 8.91 | 51.40 | 0.50 | 46.1 |
| 20 | 6 | 106 | 406 | 453 | 2.8 | 99.1 | 0.51 | 8.66 | 49.71 | 0.50 | 46.2 |
| 21 | 8 | 106 | 402 | 460 | 3.3 | 99.2 | 0.44 | 8.62 | 50.67 | 0.45 | 45.8 |
| 22 | 8 | 106 | 401 | 457 | 3.2 | 99.5 | 0.31 | 8.60 | 51.42 | 0.50 | 45.7 |
| 23 | 10 | 106 | 395 | 460 | 3.8 | 99.5 | 0.31 | 8.75 | 50.28 | 0.52 | 45.4 |
| 24 | 10 | 106 | 398 | 458 | 3.5 | 99.6 | 0.26 | 8.59 | 51.26 | 0.40 | 45.7 |

EXAMPLE 4

Table IV shows retention time and reaction temperature in a similar series of tests. The chalcopyrite concentrate used in these tests contained about 26.5 percent by weight copper. The particle size distribution of this concentrate was average. Again, the first two tests, numbered 25 and 26, represent the Primary Reduction Stage results on this concentrate.

TABLE IV

| Test No. | Time (Hours) | Temp. (°C.) | FILTRATE ORP (mV) | FILTRATE pHE (mV) | % S Total Oxidized | % Cu Dissolved | RESIDUE SOLIDS Cu Assay (%) | Fe Assay (%) | S° Assay (%) | Mo Assay (%) | Mass: % of Initial |
|---|---|---|---|---|---|---|---|---|---|---|---|
| 25 | 1½ | 106 | 377 | 446 | 4.96 | 58.9 | 15.93 | 20.5 | 20.58 | 0.53 | 68.4 |
| 26 | 1½ | 106 | 377 | 442 | 5.39 | 58.4 | 16.09 | 20.5 | 20.12 | 0.55 | 68.6 |
| 27 | 1 | 110 | 441 | 431 | 1.10 | 88.0 | 5.95 | 13.65 | 39.35 | 0.76 | 53.4 |
| 28 | 1 | 110 | 443 | 423 | 1.99 | 89.0 | 5.50 | 13.24 | 40.35 | 0.70 | 53.0 |
| 29 | 2 | 110 | 425 | 440 | 2.00 | 94.0 | 3.17 | 11.81 | 45.38 | 0.75 | 50.1 |
| 30 | 2 | 110 | 424 | 443 | 1.86 | 94.8 | 2.75 | 11.76 | 45.96 | 0.74 | 49.7 |
| 31 | 3 | 110 | 414 | 447 | 2.76 | 97.3 | 1.49 | 10.41 | 48.90 | 0.84 | 48.0 |
| 32 | 3 | 110 | 416 | 448 | 2.33 | 97.3 | 1.49 | 10.69 | 48.90 | 0.77 | 48.2 |
| 33 | 1 | 115 | 434 | 436 | 2.00 | 90.8 | 4.71 | 12.62 | 42.45 | 0.85 | 51.7 |
| 34 | 1 | 115 | 433 | 432 | 1.29 | 91.0 | 4.63 | 12.95 | 41.71 | 0.66 | 51.8 |
| 35 | 2 | 115 | 417 | 448 | 3.48 | 97.4 | 1.41 | 10.75 | 47.40 | 0.77 | 48.3 |
| 36 | 2 | 115 | 417 | 448 | 2.57 | 96.6 | 1.86 | 10.60 | 47.39 | 0.77 | 48.3 |
| 37 | 3 | 115 | 405 | 458 | 3.56 | 98.5 | 0.83 | 10.10 | 49.34 | 0.79 | 47.0 |
| 38 | 3 | 115 | 406 | 454 | 3.83 | 98.6 | 0.77 | 10.06 | 48.87 | 0.79 | 47.2 |
| 39 | 1 | 120 | 424 | 440 | 2.07 | 94.5 | 2.90 | 11.62 | 45.01 | 0.84 | 50.0 |
| 40 | 1 | 120 | 424 | 440 | 2.02 | 94.6 | 2.88 | 11.70 | 44.67 | 0.74 | 49.9 |
| 41 | 2 | 120 | 406 | 452 | 4.54 | 98.5 | 0.85 | 10.34 | 49.26 | 0.78 | 47.4 |
| 42 | 2 | 120 | 407 | 453 | 3.51 | 98.8 | 0.69 | 10.25 | 49.01 | 0.82 | 47.1 |
| 43 | 3 | 120 | 392 | 459 | 4.71 | 99.4 | 0.35 | 9.71 | 49.60 | 0.80 | 46.3 |
| 44 | 3 | 120 | 391 | 459 | 5.17 | 99.2 | 0.44 | 10.02 | 49.45 | 0.80 | 46.3 |

EXAMPLE 5

Table V shows the results obtained after several secondary reduction stage test residues were wet screened through a number 60 Tyler screen producing a sulfur rich plus 60 mesh fraction and sulfur deficient minus 60 mesh screen fraction. The sulfur can be agglomerated by properly cooling the secondary reduction reactor from above the melting point of sulfur to below the melting point. Agglomeration of the sulfur can also be achieved after the washing step by reslurrying the residue solids with water and heating the pulp to about 120C for a few minutes and cooling, with proper agitation, to freeze the newly formed spheres of sulfur. This slurry is then passed to a screening device as above.

TABLE V

| | RESIDUE ASSAYS Input Mass (grams) | % Mass in Fraction | Cu Assay (%) | Mo Assay (%) | S° Assay (%) | % DISTRIBUTION Cu | Mo | S° |
|---|---|---|---|---|---|---|---|---|
| Input Mass | 56.0 | 100.0 | 0.75 | 0.56 | 53.0 | 100.0 | 100.0 | 100.0 |
| +60 mesh fraction | 26.0 | 46.4 | 0.16 | 0.21 | 98.5 | 9.9 | 17.2 | 86.2 |
| −60 mesh fraction | 30.0 | 53.6 | 1.26 | 0.87 | 13.6 | 90.1 | 82.8 | 13.8 |
| Input Mass | 53.6 | 100.0 | 0.45 | 0.46 | 61.4 | 100.0 | 100.0 | 100.0 |
| +60 mesh fraction | 29.2 | 54.5 | 0.11 | 0.05 | 99.1 | 13.3 | 5.9 | 87.9 |
| −60 mesh fraction | 24.4 | 95.5 | 0.86 | 0.95 | 16.3 | 86.7 | 94.1 | 12.1 |
| Input Mass | 48.7 | 100.0 | 0.78 | 0.54 | 51.9 | 100.0 | 100.0 | 100.0 |
| +60 mesh fraction | 22.1 | 45.4 | 0.23 | 0.08 | 97.5 | 13.4 | 6.6 | 85.3 |
| −60 mesh fraction | 26.6 | 54.6 | 1.23 | 0.93 | 14.0 | 86.6 | 93.4 | 14.7 |

EXAMPLE 6

Table VI shows the results of experiments testing the effects of retention time and reaction temperature on the performance of the Combined Regeneration-Purge-Oxidation stage. These tests were done at the indicated temperature using a stirred autoclave and an oxygen atmosphere at a total pressure of 60 psig. The feed solution is given in Table I while the feed solids were typical Secondary Reduction Stage discharge solids from which sulfur had been extracted by carbon disulfide solvent extraction. The input solution to input solids ratio was about 74:1.

TABLE VI

| | | | FILTRATE OUT | | | | RESIDUE SOLIDS | | | | |
|---|---|---|---|---|---|---|---|---|---|---|---|
| Test No. | Temp. (°C.) | Time (min.) | ORP (mV) | pHE (mV) | SO$_4$ Assay (%) | Fe Assay (%) | Cu Assay (%) | Fe Assay (%) | K Assay (%) | S° Assay (%) | Mass Ratio out/in |
| 1 | 130 | 15 | 529 | 379 | 0.06 | 1.15 | 0.29 | 39.25 | 0.52 | 0 | 2.67 |
| 13 | 130 | 15 | 521 | 379 | 0.10 | 1.16 | 0.34 | 39.32 | 0.34 | 0.2 | 2.63 |
| 2 | 130 | 30 | 575 | 393 | 0.07 | 1.02 | 0.13 | 40.91 | 0.59 | 0 | 2.92 |
| 14 | 130 | 30 | 578 | 392 | 0.21 | 1.06 | 0.12 | 40.72 | 0.40 | 0.2 | 2.72 |
| 3 | 130 | 45 | 575 | 379 | 0.1 | 1.02 | 0.10 | 39.74 | 1.06 | 0 | 2.82 |
| 15 | 130 | 45 | 585 | 396 | 0.21 | 1.21 | 0.13 | 40.01 | 0.57 | 0 | 2.72 |
| 4 | 130 | 60 | 589 | 403 | 0.32 | 1.23 | 0.11 | 39.59 | 1.00 | 0 | 2.78 |
| 16 | 130 | 60 | 589 | 400 | 0.22 | 1.18 | 0.17 | 39.53 | 0.98 | 0 | 2.83 |
| 5 | 140 | 15 | 509 | 376 | 0.14 | 1.28 | 0.16 | 38.24 | 0.49 | 0 | 2.49 |
| 17 | 140 | 15 | 509 | 372 | 0.12 | 1.29 | 0.19 | 38.10 | 0.95 | 0 | 2.52 |
| 6 | 140 | 30 | 568 | 393 | 0.21 | 1.27 | 0.11 | 39.71 | 0.83 | 0.5 | 2.76 |
| 18 | 140 | 30 | 571 | 392 | 0.14 | 1.41 | 0.11 | 40.21 | 0.69 | 0 | 2.75 |
| 7 | 140 | 45 | 578 | 399 | 0.29 | 1.24 | 0.23 | 38.62 | 0.76 | 0 | 2.80 |
| 19 | 140 | 45 | 581 | 396 | 0.31 | 1.07 | 0.11 | 39.54 | 1.06 | 0 | 2.70 |
| 8 | 140 | 60 | 585 | 401 | 0.31 | 1.27 | 0.20 | 38.80 | 0.85 | 0 | 2.86 |
| 20 | 140 | 60 | 583 | 403 | 0.31 | 1.08 | 0.15 | 38.74 | 1.27 | 0 | 2.79 |
| 9 | 150 | 15 | 483 | 362 | 0.09 | 1.80 | 0.12 | 33.66 | 1.46 | 0 | 2.06 |
| 21 | 150 | 15 | 478 | 374 | 0.08 | 1.72 | 0.22 | 31.92 | 1.57 | 0 | 2.05 |
| 10 | 150 | 30 | 529 | 389 | 0.12 | 1.26 | 0.13 | 39.43 | 0.36 | 0 | 2.65 |
| 22 | 150 | 30 | 524 | 388 | 0.11 | 1.17 | 0.11 | 38.93 | 1.46 | 0 | 2.55 |
| 11 | 150 | 45 | 561 | 389 | 0.23 | 1.32 | 0.23 | 39.39 | 1.14 | 0 | 2.80 |
| 23 | 150 | 45 | 511 | 388 | 0.06 | 1.26 | 0.08 | 38.09 | 1.54 | 0 | 2.49 |
| 12 | 150 | 60 | 572 | 403 | 0.24 | 1.22 | 0.16 | 39.28 | 1.23 | 0 | 2.73 |
| 24 | 150 | 60 | 543 | 402 | 0.20 | 1.14 | 0.19 | 39.30 | 1.67 | 0 | 2.66 |

The successful operation of the Primary Reduction Sage, the Secondary Reduction Stage, and the Combined Regeneration-Purge-Oxidation Stage depends on the ability to induce and disperse oxygen rich gas into the reacting slurry. This is most easily accomplished by use of motor driven impellers or agitators.

The practice of this invention is not limited to the use of any special equipment. The stages and process steps described herein may be conducted on a batch or continuous basis and in any appropriate conventional equipment, including for example, reactors, containers and vessels which may be made open or closed to the atmosphere by conventional means. Moreover, each stage, step or section as described herein may be conducted in one or more reactors, vessels or containers. Further, the use of available compartmented, divided or segmented units of equipment is within the contemplation of this invention.

From the foregoing description, one skilled in the art can easily ascertain the essential characteristics of this invention, and without departing from the spirit and scope thereof, can make various changes and modifications of the hydrometallurgical copper recovery system to adapt it to various usages and conditions. Thus, the preferred embodiments are, therefore, to be construed as merely illustrative and not limitative of the disclosure in any way whatsoever.

What is claimed is:

1. In a hydrometallurgical process for the production of metallic copper comprising:
   (a) a reduction stage in which materials containing copper-iron sulfide ore concentrates are introduced into an aqueous chloride solution containing cupric chloride and ferric chloride to solubilize at least a portion of the copper in said materials and reduce at least a portion of the cupric chloride to cuprous chloride, the total chloride ion concentration relative to the water content of said chloride solution being maintained at a sufficient level to minimize precipitation of cuprous chloride in said solution by the addition of a saline metal chloride selected from the group consisting of sodium chloride, potassium chloride, magnesium chloride and mixtures thereof to said solution;
   (b) an electrolytic copper recovery stage in which metallic copper is recovered at the cathode by reduction of the cuprous chloride in the solution from the reduction stage, and in which cupric chloride is regenerated at the anode; and
   (c) an oxidation stage combined with a regeneration-pure-stage wherein a raffinate from the copper recovery stage is reacted with oxygen to form a solution containing ferric chloride which concurrently oxidizes the unreacted materials from the reduction stage to solubilize substantially all the remaining copper in the materials and form a solution containing cupric chloride, and recycling the chloride solution containing cupric chloride to the reduction stage,
   the improvement comprising: a secondary reduction stage in which the partially reacted copper-iron sulfide ore concentrate which discharges from the reduction stage of said process is used as feed solids to the second reduction reactor wherein the partially reacted feed solids are introduced into a portion of the aqueous chloride solution from the oxidation stage, thereby producing a reacted slurry, feeding the slurry to a liquid-solids separation device in which the substantially reacted copper-iron sulfide ore concentrate is separated from the bulk of the solution as a thick slurry, said solution containing cuprous chloride ferrous chloride and some unreacted cupric chloride, passing the thick slurry containing the solids to a by-product recovery stage which comprises a separator where the solids from the secondary reduction stage liquid-solids separation device are washed to free them of process solution and elemental sulfur from the washed secondary reduction stage discharge solids, thereby producing elemental sulfur free of residue solids at least a portion of the cuprous chloride containing solution from said secondary reduction stage comprising anode compartment feed solution in said electrolytic copper recovery stage to thereby insure the presence of excess cuprous chloride at the anode.

2. The process of claim 1, further comprising a molybdenum compound recovery section of the by-product recovery stage comprising extracting molybdenum compounds from the substantially elemental sulfur-free solids obtained from the elemental sulfur recovery section of the by-product recovery stage.

3. The process of claim 2, further comprising a gold recovery section of the by-product recovery stage comprising extracting gold from the substantially elemental sulfur-free and substantially molybdenum-free residue solids obtained from the molybdenum compound recovery section of the by-product recovery stage.

4. The process of claim 1 further comprising a gold recovery section of the by-product recovery stage comprising extracting gold from the substantially elemental sulfur-free residue solids obtained from the elemental sulfur recovery section of the by-product recovery stage.

5. The process of claim 3 further comprising a molybdenum compound recovery section of the by-product recovery stage comprising extracting molybdenum compounds from the substantially elemental sulfur-free and substantially gold-free residue solids obtained from the gold recovery section of the by-product recovery stage.

6. The process of claims 2, 3, 4 or 5 wherein the residue solids, substantially free of by-product residue solids, obtained from the by-product recovery stage, is passed as feed solids to the oxidation stage combined with a regeneration-purge stage.

7. The process of claim 2, further comprising conducting the secondary reduction stage reactor at the normal boiling temperature of the solution at atmospheric pressure.

8. The process of claim 2 wherein the secondary reduction stage reactor is operated essentially closed to the atmosphere.

9. The process of claim 2 wherein the reaction temperature of the secondary reduction stage reactor is maintained at a temperature of between about 107° C. and 140° C., and at a pressure at least equal to the vapor pressure of water in equilibrium with the solution.

10. The process of claim 9, further comprising subjecting the solids from the secondary reduction stage to an agitated cooling step whereby globules of elemental sulfur are frozen.

11. The process of claim 1, further comprising an elemental sulfur melting and agglomeration step in which the essentially process solution free residue solids obtained from the washing filter are slurried with water and heated, with agitation and under pressure to prevent boiling, to a temperature between the melting temperature of elemental sulfur, and a temperature of about 130° C., followed by an agitated cooling step in which the globules of molten sulfur are frozen and recovered.

12. The process of claims 10 or 11, further comprising initially separating elemental sulfur from the solids from the secondary reduction stage by a screening operation where a substantial portion of the elemental sulfur is concentrated in the screen oversize fraction.

13. The process of claim 12 in which the screen has openings larger than a Tyler 100 mesh screen but smaller than a Tyler 28 mesh screen.

14. The process of claim 13 in which the screen comprises a Tyler 60 mesh screen.

15. The process of claim 12 further comprising extracting remaining elemental sulfur from the screen undersize fraction by use of a solvent selected from the group consisting of tetrachloroethane, tetrachloroethylene, pentachloroethane, and mixtures thereof.

* * * * *